J. DE S. BENNEHOFF.
WATER DISTILLING APPARATUS.
APPLICATION FILED APR. 13, 1910.
1,011,016.
Patented Dec. 5, 1911.
2 SHEETS—SHEET 2.
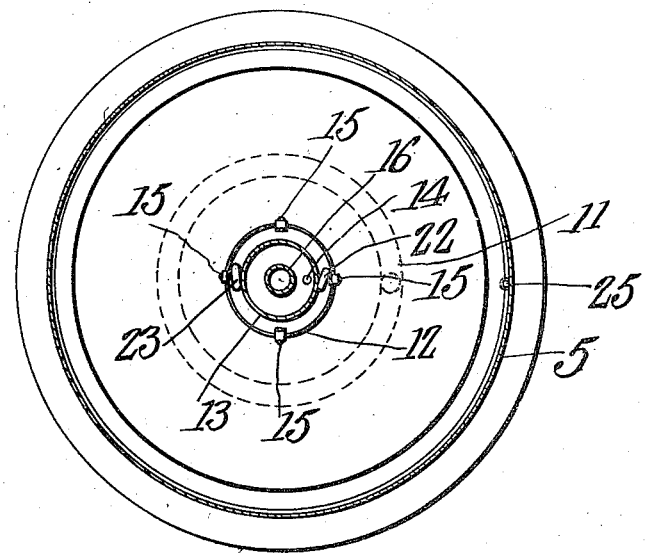
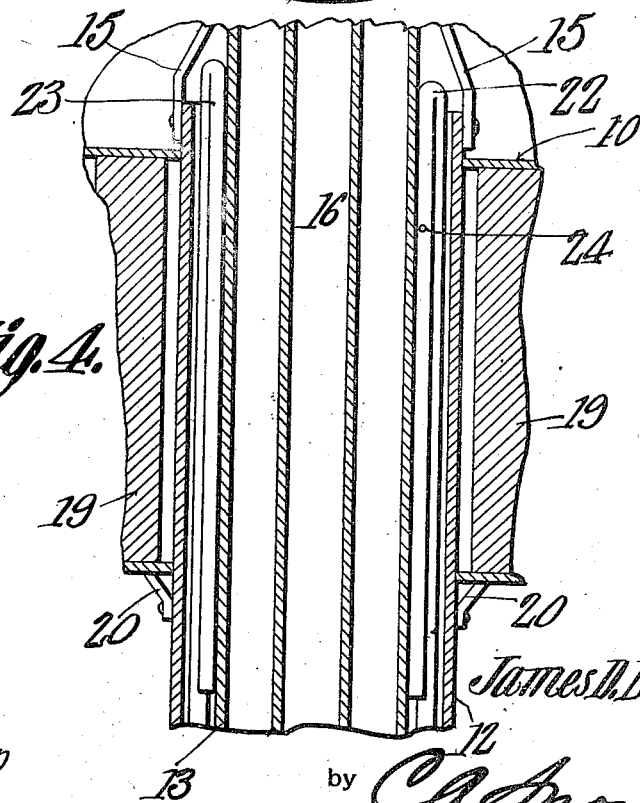

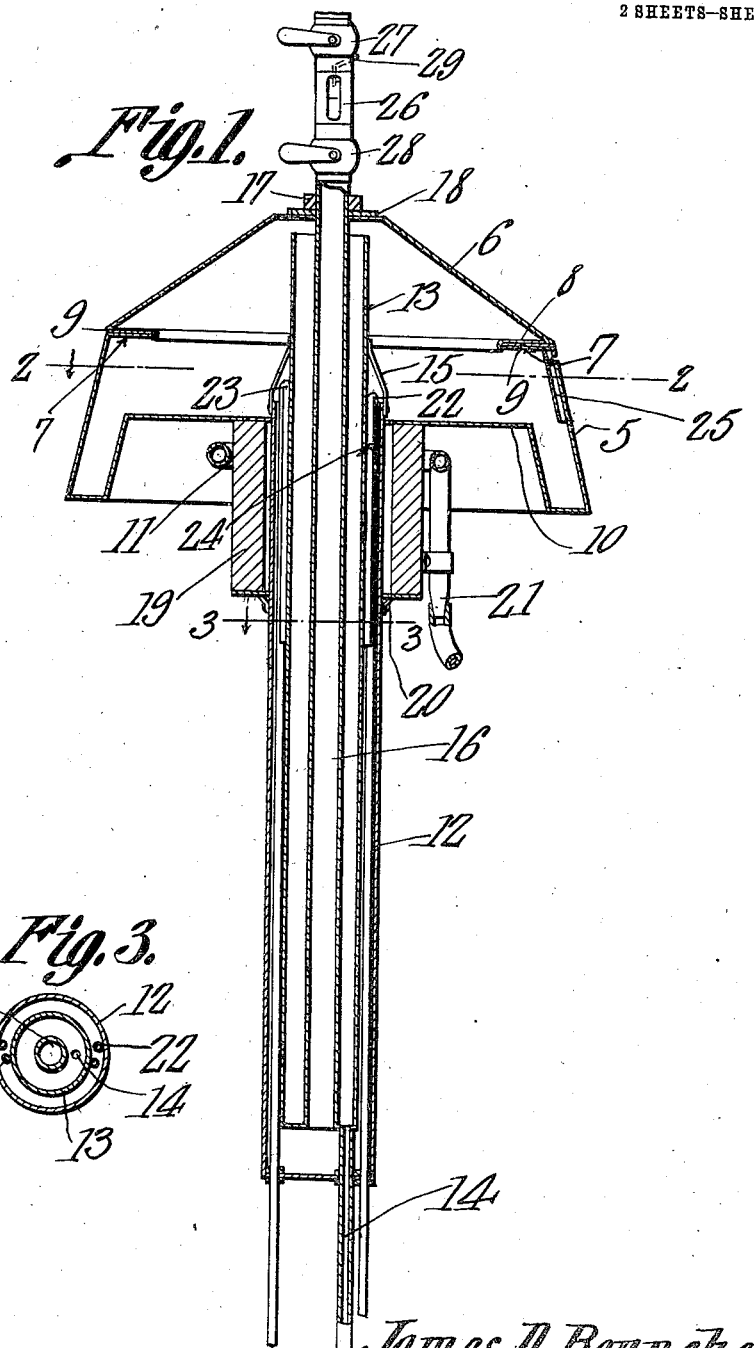

UNITED STATES PATENT OFFICE.

JAMES DE SETT BENNEHOFF, OF ALFRED, NEW YORK.

WATER-DISTILLING APPARATUS.

1,011,016.        Specification of Letters Patent.        Patented Dec. 5, 1911.

Application filed April 13, 1910. Serial No. 555,232.

*To all whom it may concern:*

Be it known that I, JAMES DE SETT BENNEHOFF, a citizen of the United States, residing at Alfred, in the county of Allegany and State of New York, have invented a new and useful Water-Distilling Apparatus, of which the following is a specification.

This invention relates to apparatus for distilling water, and it has for its object to provide a simple and efficient apparatus of this kind which is compact in form, and which has a large condensing surface.

The invention also has for its object to provide improved means for automatically maintaining a proper water level in the apparatus, said means being adjustable so that the capacity of the apparatus may be increased or diminished.

With these objects in view, the invention consists in a novel construction and arrangement of parts to be hereinafter described and claimed, reference being had to the accompanying drawings, in which, Figure 1 is a central vertical section of the apparatus. Figs. 2 and 3 are horizontal sections on the lines 2—2 and 3—3 respectively of Fig. 1. Fig. 4 is an enlarged vertical section of a part of the apparatus.

Referring more specifically to the drawings, the still proper or retort comprises a vessel 5 having a removable head 6, both of said parts being frusto-conical. The vessel and head have inturned flanges 7 and 8, respectively, which match, and between which a gasket 9 is placed. The inner ends of the flange 8 is bent over the inner edge of the gasket and the flange 7, to protect the former from the steam. The bottom of the vessel has a central raised portion 10 within which is located a burner 11 which may be an ordinary gas burner, a ring burner being shown.

Entering the bottom of the vessel 5 and rising a short distance therefrom, is a cylindrical tube 12. This tube depends a suitable distance from the vessel, and its lower end is closed, its upper end being open so as to discharge into the vessel. The tube 12 is rigidly fastened to the bottom of the vessel.

Supported centrally within the tube 12, in spaced relation therewith, is a tube 13, which rises at its upper end from the upper end of said tube 12, and extends into the head 6, the upper end of said tube 13 being open. The lower end of the tube 13 is closed and extends to within a short distance of the lower end of the tube 12. To the closed lower end of the tube 13 is connected a pipe 14 which passes through the lower end of the tube 12. This pipe 14 conducts the products of the still to the place of use. The tube 13 is located concentrically within the tube 12, and it is supported therein by brackets 15 carried by the upper end of the tube 12.

Located concentrically in the tube 13, in spaced relation therewith, is a pipe 16. This pipe enters the upper open end of the tube 13 by passing through the top of the head 6 and its lower end opens through the lower closed end of the tube 13, into the tube 12. The pipe 16 is exteriorly screw threaded adjacent to the head 6, and on said threaded portion is screwed a nut 17. The top of the head 6 is flat, and between said flat portion of the top, and the nut 17, is interposed a gasket 18. Upon tightening this nut, the head 6 will be securely fastened to the vessel 5. This structure enables the head to be readily removed, and thus makes the vessel easily accessible for cleaning and other purposes.

At 19 is indicated an asbestos ring encircling the tube 12 adjacent to the bottom of the vessel 5, said ring being located within the burner ring 11, and secured to the tube 12 by brackets 20. The supply connection to the burner is indicated at 21. In the tube 12 are also located siphons 22 and 23 respectively. The long legs of these siphons extend from the closed lower end of the tube 12, a water tight joint being made by any suitable means. The inlet ends of the short legs of the siphons are located a considerable distance below the vessel 5, which is for a purpose to be presently described. The crowns of the siphons are located at different levels above the level of the top of the tube 12, and near the crown of the siphon 22, the short leg of said siphon has a port 24.

At 25 is indicated a low water alarm, the same comprising a whistle having its tube extending below the normal water level in the vessel 5, so that when said level drops sufficiently to uncover the tube, the whistle will be sounded by the escaping steam, thus giving an audible signal when the water gets too low in the vessel.

In the pipe 16, above the retort is a glass gage 26 having cocks above and below, indicated at 27 and 28 respectively, with a small tube 29 from the lower side of the cock 27 opening into the gage, and opening at its upper end into the atmosphere.

The operation of the apparatus is as follows: The feed of water is regulated by the cock 27. The tube 29 lets atmospheric pressure on the water in the gage 26 which is provided with a sight glass, as shown in Fig. 1. The cock 28 controls the feed into the pipe 16, and when properly regulated, water will be maintained at the level in the gage 26 as shown, and never under greater than atmospheric pressure. Water entering the pipe 16 flows downwardly in the same, and enters the tube 12 in which it rises, and overflows at the upper end of said tube into the vessel 5. The burner 11 being lighted, the water in the vessel 4 is heated, and steam is generated. Steam enters the tube 13 at its upper open end, and passes down said tube, in which it is condensed, the water of condensation passing out of the tube through the pipe 14 to the place of use. Inasmuch as the tube 16 is entirely surrounded by the cold water in the tube 12, it is kept cool, and the steam is rapidly condensed. The inlet water in rising past the level of the inlet end of the siphons 22 and 23 closes the siphon against the escape of steam. Upon reaching the crown of the siphon 22, water begins to overflow into the long leg of said siphon. When the water reaches the upper end of the tube 12 the water flows into the vessel 5 and fills it up to that level. If the water should rise to the crown of the siphon 23, said siphon will begin to overflow. A rise of the water level sufficiently to entirely fill the crown of the siphon 22, starts the same, and if the water continues to rise so as to fill the crown of the siphon 23, said siphon also commences to operate, and both siphons now operate together, whereupon the water will be quickly lowered to the level of the port 24. The siphon 22 is now broken, and if the inflow is not too much, the siphon 23 will reduce the water level to the inlet ends of the siphons, whereupon the filling process will be repeated. It will be noticed that the siphons draw water from the tube 12, and not from the vessel 5, in view of which there will be no waste of the boiling water. The asbestos ring 19 shields the upper end of the tube 12 from the burner 11, and the water therefore remains cool in said end of the tube. In case the still is heavily taxed, an excess of cold water to aid in the condensation of the steam can be turned on without fear, since the siphon 22 has its inlet end located below the port 24. The steam therefore cannot exhaust from the apparatus.

For the purpose of rapid condensation, it is necessary that the condensing surface be kept cool. It is designed that sufficient water be let into the still to keep the siphon 22 working practically all the time, the siphon 23 operating only in case the inflow is more than the siphon 22 can take care of. There is sufficient water in the retort below the upper end of the tube 12 to protect the still, for when siphon 22 draws the water to the port 24 it immediately flows to the top of the tube 12. Again if more water is turned on than the siphon 22 can take care of, then the siphon 23 draws the water down to the bottom of its short leg but with that amount of inflow it at once fills the space between the tubes 12 and 13 to the top of the tube 12, and thus the boiling water is kept at a certain level in the still. The water warmed in the tube by the condensation of steam is constantly being drawn from the space between the tubes 12 and 13 and replaced by cold water from the tube 16 thus hastening condensation. It is to be understood that only a very small proportion of the water that passes through the apparatus is distilled, say approximately one gallon in fifty.

The gage cock 28 regulates the feed to the still and should be opened just enough to operate the siphon 22. If the cock 27 (under pressure) is not opened sufficiently the water will flow to the level of the water in the still, and if opened too much will throw water from the opening 29 in the gage. The object is to open the cock 27 just enough to keep the water at the level 26.

It would appear from a casual glance that that portion of the siphon 22 below the hole 24 is useless. As is well known, only a very small hole is required to stop the action of the siphon, and when in operation, in the present instance, it draws water from the bottom of the short leg and not from the small hole to any appreciable extent, the object being to draw the water at a point remote from the boiling water. The action of the siphons cannot empty the still below the top of the tube 12, and the object of the siphons is to keep the water at a level as near that point as possible.

It will be observed by reference to Fig. 4, that the crown of the siphon 23 is disposed in a plane above that of the siphon 22. This arrangement is employed for the following reasons: When the still is in operation, the water level is allowed to vary just as much as the difference in the height of the crowns of the two siphons. If the siphon 23 is one inch higher than the siphon 22, when the water level in the retort has one inch play. The siphon 23 is an emergency siphon, and is only designed to work when more water is being fed than can be exhausted by the siphon 22.

It is designed that the capacity of the two siphons will slightly exceed the pipe 16. For example, if the pipe is one-half inch in diameter, the siphons should be three eighths of an inch in diameter each. When the inflow is sufficient to start the siphon 23 the water will be drawn to the bottom of the short leg thereof, but when siphon 22 is in operation water is only drawn to the port 24, although it is drawn from the bottom of the short leg 22. The object of this is to keep the contents of the siphon as cool as possible, and at the same time to draw no hot water from the still. The port hole 24 in the siphon 22 is so small that it draws practically no liquid, but admits sufficient air, when the liquid is drawn below that point, to stop the action of the siphon. The liquid is drawn from the bottom of the short leg of the siphon 22 remote from the head as a matter of economy, and the hole 24 lets in air to stop the siphon at that point. When the liquid exceeds a certain height, the siphons tend to draw the liquid to the bottom of the siphon 22 and the short leg of siphon 23, respectively. There is abundant liquid in the retort below the top of the tube 12 which, when in operation is producing steam and the cool liquid coming up the tube 12 to replace that drawn by the siphon or siphons is cooling the condensing surface of the tube 13.

The combined capacity of the siphons are slightly to exceed that of the feed pipe 16, so that the condensing tube cannot be flooded by undistilled liquid. On the other hand, the flow should not be so small as to permit the exhaustion of liquid in the retort 5 before the tube 12 is filled to over-flowing. In this apparatus, the greater the siphonic action, the swifter will be the distillation, and the reason for employing siphons instead of an over-flow from the retort is to preserve heat.

The advantages of the herein described apparatus are its automatic action, its large condensing surface, high capacity, simplicity of construction, and ease with which the head can be removed, and the vessel cleaned.

The operation of the glass gage is as follows: The cock 28 is opened enough to admit any desired amount of water to the still, and then the cock 27 is opened just enough to keep the water at the desired level in the gage. The same result could be obtained by having the water from the cock 27 flow into an open funnel to feed the still. The object of the tube 29 is to keep the water from slopping out as it might do if only a port was made.

What is claimed is:

1. In a still, a retort, an inlet tube entering the bottom thereof, and a siphon in the tube for controlling the liquid level in the retort, said siphon having its inlet end remote from the retort.

2. In a still, a retort, an inlet tube entering the bottom thereof, a siphon in the tube for controlling the liquid level in the retort, said siphon having its inlet end remote from the retort, a burner located under the retort, and a shield surrounding that portion of the inlet tube which contains the siphon, said shield being located between the tube and the burner.

3. In a still, a retort, an inlet tube entering the bottom thereof, and siphons in the tube for controlling the liquid level in the retort, the crowns of the siphons being located at different levels, and the inlet ends of the siphons being remote from the retort.

4. In a still, a retort, an inlet tube entering the bottom thereof, a condensing tube inclosed by the inlet tube, and a supply pipe passing through the condensing tube, said supply pipe entering the condensing tube through the top of the vessel, and opening into the inlet tube at the lower end thereof.

5. In a still, a retort, an inlet tube entering the bottom thereof, a burner below the retort, a shield encircling the inlet tube, said shield being located between said tube and the burner, a condensing tube located within the inlet tube, a supply pipe passing through the condensing tube, and opening into the inlet tube, and a siphon in the inlet tube for controlling the liquid level in the retort, the inlet end of the siphon being remote from the retort.

6. In a still, a retort having a removable head, said retort and head having matching flanges, an inlet tube entering the bottom of the retort, a condensing tube in the inlet tube, a supply pipe extending through the condensing tube, and opening into the inlet tube, said supply pipe passing through the head, and means carried by said pipe for clamping the head to the retort.

7. In a still, a retort, an inlet tube entering the bottom thereof, and rising above the same, and a siphon located in the inlet tube, and having its crown located above the level of the upper end of said tube.

In testimony that I claim the foregoing as my own, I have hereto affixed my signature in the presence of two witnesses.

JAMES DE SETT BENNEHOFF.

Witnesses:
BERTHA S. KOHSMAN,
BOOTH C. DAVIS.